United States Patent
Chen

(10) Patent No.: US 11,119,675 B2
(45) Date of Patent: Sep. 14, 2021

(54) POLYMORPHISM AND TYPE CASTING IN STORAGE VOLUME CONNECTIONS

(71) Applicant: Red Hat, Inc., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/574,688

(22) Filed: Sep. 18, 2019

(65) Prior Publication Data
US 2020/0012446 A1    Jan. 9, 2020

Related U.S. Application Data

(63) Continuation of application No. 15/827,593, filed on Nov. 30, 2017, now Pat. No. 10,430,097.

(51) Int. Cl.
*G06F 3/06* (2006.01)
*G06F 9/455* (2018.01)

(52) U.S. Cl.
CPC .......... *G06F 3/0635* (2013.01); *G06F 3/0604* (2013.01); *G06F 3/067* (2013.01); *G06F 3/0659* (2013.01); *G06F 3/0664* (2013.01); *G06F 9/455* (2013.01); *G06F 9/45558* (2013.01); *G06F 2009/45583* (2013.01)

(58) Field of Classification Search
CPC .............................. G06F 3/0683; G06F 3/0635
See application file for complete search history.

(56) References Cited

U.S. PATENT DOCUMENTS

| | | | | |
|---|---|---|---|---|
| 10,430,097 | B2* | 10/2019 | Chen | G06F 3/067 |
| 2011/0145818 | A1* | 6/2011 | Vemuri | G06F 3/067 |
| | | | | 718/1 |
| 2016/0359955 | A1 | 12/2016 | Gill et al. | |
| 2017/0132029 | A1 | 5/2017 | Cui et al. | |
| 2017/0257432 | A1* | 9/2017 | Fu | H04L 67/2823 |

OTHER PUBLICATIONS

Citrix product Documentation, "Connections and resources", 2016, 17 pages.
OpenStack, "CINDER: Block storage as a service", 2016, 4 pages.
USPTO, Office Action for U.S. Appl. No. 15/827,593, dated Dec. 5, 2018.
USPTO, Notice of Allowance for U.S. Appl. No. 15/827,593, dated May 10, 2019.

* cited by examiner

*Primary Examiner* — Edward J Dudek, Jr.
(74) *Attorney, Agent, or Firm* — Lowenstein Sandler LLP

(57) ABSTRACT

Aspects of the disclosure provide for polymorphism and type casting in storage volume connections. A method of the disclosure includes storing, in a memory associated with a processing device executing a container manager, a persistent volume (PV) identifier of a PV created on a storage device and a list of polymorphic connection types supported by the PV, and responsive to receiving a query comprising the PV identifier from a container host, performing, for a connection from the container host to the storage device, type casting to identify a connection type from the list of polymorphic connection types and connection information for the connection type to enable establishment of the connection between the container host and the storage device.

17 Claims, 10 Drawing Sheets

500

```
                    START
                      │
                      ▼
┌─────────────────────────────────────────────────────────────┐
│ Receive an identifier of a persistent volume (PV) created on a storage device │
│      and list of polymorphic connection types supported by the PV            │
│                                                          510 │
└─────────────────────────────────────────────────────────────┘
                      │
                      ▼
┌─────────────────────────────────────────────────────────────┐
│          Create a PV record for the PV at the container manager              │
│                                                          520 │
└─────────────────────────────────────────────────────────────┘
                      │
                      ▼
┌─────────────────────────────────────────────────────────────┐
│ Perform, responsive to receiving a query of the PV record from a container   │
│ host, type casting associated with a connection from the container host to the│
│  storage device, where the type casting includes selecting a connection type │
│ from the list of polymorphic connection types in view of node information of the│
│              container host comprised in the query                           │
│                                                          530 │
└─────────────────────────────────────────────────────────────┘
                      │
                      ▼
┌─────────────────────────────────────────────────────────────┐
│ Return, to the container host in response to the query, the identifier of the PV│
│       and connection information to cause the container host to establish the │
│ connection to the storage device via the selected connection type, wherein the│
│ connection information is different for each of the polymorphic connection types│
│                                                          540 │
└─────────────────────────────────────────────────────────────┘
                      │
                      ▼
                    END
```

START

Execute a container manager to manage one or more containers on one or more container hosts
710

Perform, responsive to receiving a query for a PV record from a container host, type casting associated with a connection from the container host to the storage device, wherein performing the type casting comprises selecting a connection type from the list of polymorphic connection types in view of node information of the container host comprised in the query
720

Transmit, to the container host in response to the query, the identifier of the PV and connection information to cause the container host to establish the connection to the storage device via the selected connection type, wherein the connection information is different for each of the polymorphic connection types
730

END

FIG. 7

POLYMORPHISM AND TYPE CASTING IN STORAGE VOLUME CONNECTIONS

RELATED APPLICATIONS

This application is a continuation of U.S. patent application Ser. No. 15/827,593, filed Nov. 30, 2017, entitled "Polymorphism And Type Casting In Storage Volume Connections", the entire contents of which is incorporated by reference herein.

TECHNICAL FIELD

The implementations of the disclosure relate generally to computing systems and, more specifically, to methods and systems for polymorphism and type casting in storage volume connections.

BACKGROUND

Container deployment faces multiple challenges in a hybrid cloud environment where baremetal and virtualized container hosts exist. This is especially true when connecting containers to backend storage systems. On virtualized container host, containers can run inside a virtual machine (VM). In this case block storage is presented to the VM and containers by a hypervisor that masks detailed storage connection information. On the other hand, when containers are running on remote baremetal container hosts, the containers have to connect to the same storage asset through a transport that the container host can initiate. In yet another case, the containers may run on a container host where the physical storage is collocated on the container host. In this case, the containers can use the local storage without having to initiate any remote access protocols to connect.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 5 is a flow diagram illustrating a method for polymorphism and type casting in storage volume connections as applied by a container manager, according to an implementation of the disclosure;

FIG. 7 is a flow diagram illustrating another method for polymorphism and type casting in storage volume connections as applied by a container manager, according to an implementation of the disclosure;

DETAILED DESCRIPTION

Figure 1:
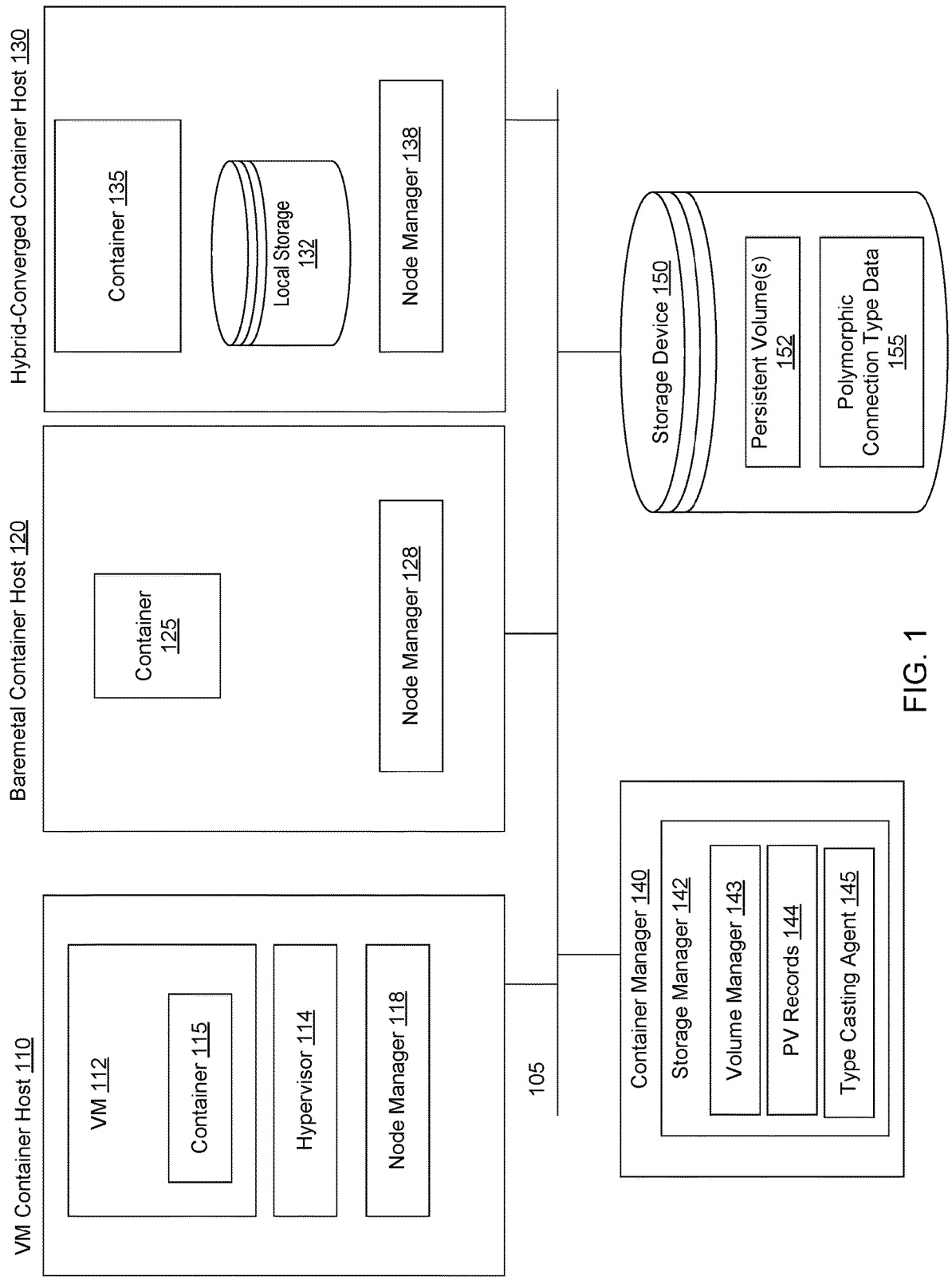
FIG. 1 is a block diagram illustrating example computer systems according to implementations of the disclosure.

Aspects of the disclosure provide for systems and methods for polymorphism and type casting in storage volume connections. Container deployment systems face multiple challenges in a hybrid cloud environment where baremetal and virtualized container hosts exist. A container in a container deployment system may refer to an allocation, portioning, and assignment of host (compute) resources, such as central processing unit (CPU) shares, network input/output (I/O), bandwidth, block I/O, and memory, in a way that these protected resources are isolated (or "contained") so that that specific running services (processes) and namespaces may solely utilize them without interfering with the rest of the system.

The challenges faced by container deployment systems in a hybrid cloud environment are especially apparent when connecting containers to backend storage systems (storage devices). On virtualized container hosts, containers can run inside a virtual machine (VM). In this case, block storage is presented to the VM and containers by a hypervisor that masks detailed storage connection information. On the other hand, when containers are running on remote baremetal container hosts, the containers have to connect to the same storage asset through a transport that the container host can initiate. In yet another case, the containers may run on a container host where the physical storage is collocated on the container host. In this case, the containers can use the local storage without having to initiate any remote access protocols to connect. These varied connection options corresponding to deployed containers can make connecting containers to the backend storage system a complex process.

Implementations of the disclosure introduce polymorphism and type casting for storage volume connections. In contrast to conventional system's utilization of singleton and concrete types of storage connection configurations, a polymorphic connection type is provided so that access to the storage device can be determined on-the-fly (e.g., at runtime) by the container host. Examples of the polymorphic connection types may include, but are not limited to, hypervisor initiated type, remote protocol access type, and local storage access type. Polymorphism, in programming languages and type theory, is the provision of a single interface to entities of different types. In other words, subclasses of a class can define their own unique behaviors and yet share some of the same functionality of the parent class.

A type casting mechanism is attached to the polymorphic connection type. Type casting refers to the act or result of changing an entity of one data type into another. Each time a container host is to resolve the connection type to the storage device, the container host passes its node information to a container manager that determines the appropriate connection information from the polymorphic connection types and provides this connection information to the container host. The container host then utilizes this connection information to establish a connection to the storage device in order to access storage.

Utilization of the polymorphism and type casting for storage volume connections in container deployment systems can allow for automated implementation of varied connection protocols in a container deployment system, without limiting the storage connection configuration options of the container host. This results in an improved connection process to backend storage system, improved connection options available in the container deployment system, and faster and more efficient performance of the overall container deployment system.

FIG. 1 is a block diagram of an example of a container deployment system 100 according to some implementations of the disclosure. "Container deployment system" as used herein may be and/or include one or more computing devices, where each computing device may comprise one or more processors, one or more memory devices, and one or more input/output (I/O) interfaces.

As illustrated in FIG. 1, container deployment system 100 may include one or more container hosts 110, 120, 130, a container manager 140, and a storage device 150. As illustrated in FIG. 1, container hosts 110-130, container manager 140, and storage device 150 may be interconnected via a network 105. Network 105 can include a private network (e.g., a local area network (LAN)), a wide area network (WAN), intranet, etc.), a public network (e.g., the Internet), etc.

Each of container hosts 110-130 and container manager 140 may include processors (e.g., central processing units (CPUs)) communicatively coupled to memory devices. Local connections within container hosts 110-130 and container manager 140, including connections between processors and memory devices, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some implementations.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

As illustrated in FIG. 1, container hosts 110-130 may be implemented in a variety of different environments. Each of container hosts 110-130 is responsible for deploying containers 115, 125, 135 in container deployment system 100. A container 115, 125, 135 is an allocation, portioning, and assignment of host (compute) resources, such as CPU shares, network I/O, bandwidth, block I/O, and memory (RAM), in a way that these protected resources are isolated (or "contained") so that that specific running services (processes) and namespaces may solely utilize them without interfering with the rest of the system. The processes may be lightweight Linux hosts based on a Linux image, multiple web servers and application, a single subsystem like a database backend, to a single process such as 'echo "hello"' with little to no overhead. Containers 115, 125, 135 are sometimes referred to as "operating system-level virtualization" or "OS virtual environments" and they differ from hypervisor-level virtualization. The container model eliminates the hypervisor layer, redundant OS kernels, binaries, and libraries used to run workloads in a VM.

Containers 115, 125, 135 may be hosted in a variety of different environments, such as a hypervisor-based environment, a baremetal environment, or a hybrid-converged environment (having local storage access). These environments are represented, respectively, in FIG. 1 as VM container host 110, baremetal container host 120, and hybrid-converged container host 130.

VM container host 110 may deploy a container 115 within a VM 112 managed by a hypervisor 114. Hypervisor 114 is a software layer 150 (above the hardware and below the VMs) of the container host 110 that executes the VM. In implementations of the disclosure, a "VM" may also be referred to as a "guest" and these terms may be used interchangeably herein. In certain implementations, hypervisor 114 may be a component of an operating system (OS) executed by the VM container host 110. Alternatively, hypervisor 114 may be provided by an application running under the VM container host's 110 OS, or may run directly on the corresponding VM container host 110 without an OS beneath it. Hypervisor 114 may abstract the physical layer, including processors, memory, I/O devices, etc. and present this abstraction to VM 112 as virtual devices, including virtual processors, virtual memory, virtual I/O devices, etc. A hypervisor 114 may abstract the physical layer and present this abstraction to VM 112 to use, by providing interfaces between the underlying hardware and virtual devices of VM 112.

Baremetal container host 120 may deploy a container 125 directly on the physical components (CPUs, memory, etc.) of the baremetal container host 120 without the use of a virtualization system. Hybrid-converged container host 130 may deploy a container 135, either in a virtualized environment or directly on the hardware of the container host 130, which is physically co-located with the storage device 132 it is to access.

Each of the container hosts 110-130 may execute a respective node manager 118, 128, 138. The node manager 118, 128, 138 may support polymorphism and type casting in storage volume connections in accordance with one or more aspects of the disclosure, as described further below. In certain implementations, a node manager 118, 128, 138 may be implemented as a software component on the respective container host 110-130. Alternatively, functions of node manager 118, 128, 138 may be performed by a hypervisor, such as hypervisor 114. In certain implementations, a node manager 118, 128, 138 may be implemented as a software component of a guest OS invoked by a VM of the container host 110-130. Alternatively, functions of node manager 118, 128, 138 may be performed by a VM. In some implementations, node manager 118, 128, 138 can implement one or more aspects of the disclosure as described in connection with FIGS. 2-9.

In container deployment system 100, container hosts 110-130 may be provisioned portions of storage resources, such as storage device 150 or local storage 132, to be consumed by the container hosts 110-130. In one implementation, storage device 150 and/or local storage 132 may be a memory (e.g., random access memory), a cache, a drive (e.g., a hard drive), a flash drive, a database system, or another type of component or device capable of storing data. The storage device 150 and/or local storage 132 may also include multiple storage components (e.g., multiple drives or multiple databases) that may also span multiple computing devices (e.g., multiple server computers).

In one implementation, a container manager 140, communicably coupled to container hosts 110-130, is responsible for managing the container hosts 110-130 and the lifecycle of the containers 115, 125, 135 deployed on container host 110-130. Container manager 140 may reside on a designated computer system. Container manager 140 may be responsible for provisioning new storage when added to the container deployment system 100 and binding the provisioned storage to compute resources, such as containers 115, 125, 135, in the container deployment system 100. In one implementation, container manger 140 supports polymorphism and type casting in storage volume connections, in accordance with one or more aspects of the disclosure. In some implementations, container manager 140 can implement one or more aspects of the disclosure as described in connection with FIGS. 2-9.

For ease of explanation, the following description discusses storage device 150 in terms of implementations of the disclosure. However, the description provided similarly applies to local storage device 132 as well.

Container manager 140 may include a storage manager 142 including a volume manager 143 and a type casting agent 145. When a storage device 150 is added to container deployment system 100, the storage manager 142 is responsible for configuring the storage device 150 for use by containers 115, 125, 135 in container deployment system 100. The volume manager 142 of storage manger 142 may request to create persistent volumes (PVs) 152 on the storage device 150. APV 152 may refer to a portion of storage of the storage device 150 that has been provisioned by the storage manager 142. The PV 152 may include a directory and data which is accessible to the containers 115, 125, 135 to which it is assigned. How the directory comes to be, the medium that backs it, and the contents of it are determined by the particular volume type (e.g., iSCSI, cephfs, nfs, glusterfs, rbd, cloud provider specific storage system such as awsElasticBlockStore, etc.) used. APV 152 may have a lifecycle that is independent of the individual container(s) 115, 125, 135 that use it. Although implementations of the disclosure specifically discuss persistent volumes (PVs), other types of storage resources consumable by a container may be utilized in the polymorphism and type casting in storage volume connections described herein.

In implementations of the disclosure, when the storage device 150 creates the PV 152, it provides an identifier of the PV 152 as well as a list of polymorphic connection types (polymorphic connection type data 155) supported by the PV 152. Examples of the polymorphic connection types may include, but are not limited to, hypervisor initiated type, remote protocol access type, and local storage access type. Polymorphism, in programming languages and type theory, is the provision of a single interface to entities of different types. In other words, subclasses of a class can define their own unique behaviors and yet share some of the same functionality of the parent class. For example, in the Java programming language, runtime polymorphism is also referred to as dynamic method dispatch and is a mechanism by which a call to an overridden method is resolved at runtime. When an overridden method is called by a reference, Java programming language determines which version of the method to execute based on the type of object it referred to. In implementations of the disclosure, each PV 152 is polymorphic in the sense that each PV 152 is associated with one or more different connection protocols represented by different classes.

The volume manager 143 creates PV records 144 for each created PV 152 provided by storage device 150, where the PV records 144 specify the identifier of the PV, other configuration information of the PV 152 (e.g., storage capacity, etc.), and the supported polymorphic connection types of the PV 152.

In implementations of the disclosure, the polymorphic connection type data 155 is provided so that access to the storage can be determined on the fly (e.g., at runtime) by the container host 110, 120 130. The protocol utilized to establish a communication connection between a container host 110-130 and storage device 150 in order for the container 115, 125, 135 to consume the PV 152 varies depending on the type of environment of the container host (e.g., hypervisor-based, baremetal, hybrid-converged). For example, the protocol to establish a connection between a container 115 executing on a VM 112 in VM container host 110 is different from the protocol used to establish a connection between a container 125 executing on baremetal container host 120, which is different from the protocol used to establish a connection between a container 135 executing in a local storage access environment of hybrid-converged container host 130.

In one implementation, when a container host 110-130 seeks to consume (e.g., mount) a storage resource (such as PV 152), the node manager 118, 128, 138 of the container host 110-130 sends a query for the PV record 144 including a PV identifier and node information of the container host 110-130. The query is an attempt to resolve the connection type to use to connect to the storage device 150. Node manager 118, 128, 138 may be aware of the PV identifier as a result of a claiming process performed by the storage manager 142 and node manager 118, 128, 138. The claiming process includes binding created PVs 152 to requests for storage (referred to as persistent volume claims or "claims") generated by node manager 118, 128, 138 for containers 115, 125, 135. A claim may be a request for a specific size and access mode (e.g., read/write, read only, etc.) of storage. Storage manager 143 may match a node manager's 118, 128, 138 claim to provisioned PVs 152 and bind the PV and claim together. The node manager 118, 128, 138 is informed of the PVs 152 (e.g., a PV identifier is provided) that are bound to claims of the node manager 118, 128, 138.

A type casting agent 145 of the storage manager 142 receives the PV record query from the node manager 118, 128, 138 and performs type casting to identify an appropriate connection type for the container host 110-130. Type casting refers to the act or result of changing an entity of one data type into another. The type casting agent 145 may receive the PV identifier and node information from the query and use this information to determine the connection protocol for the container host 110-130 to use to connect to the storage device 150. The node information may include, but is not limited to, an identity of the node (e.g., hostname, IP address, etc.), the cloud configuration (e.g., AWS, Azure, OpenStack, etc.), and machine configuration (OS distribution, kernel version, supported storage connection types, etc.).

The type casting agent 145 compares the node information to the list of polymorphic connection types of the PV record 144 corresponding to the PV identifier, and, based on this comparison, selects the connection protocol (i.e., selects one of the classes from the polymorphic connection types) that corresponds to the environment of the container host 110-130 as discerned from the provided node information. The type casting agent 145 then returns the PV 152 identifier and connection information for the chosen connection type to the node manager 118, 128, 138.

In one example, the type casting agent 145 may determine, based on the node information, that connection protocol for the VM container host 110 is a hypervisor initiated protocol type. As such, the type casting agent 145 type casts the connection protocol for the hypervisor and returns this connection information to the node manager 118. In one implementation, the connection information for the hypervisor-initiated protocol type includes a device ID of the storage device 150. The hypervisor 114 at the VM container host 110 can then utilize the device ID to connect to the storage device 150.

In another example, the type casting agent 145 may determine, based on the node information, that connection protocol for the baremetal container host 120 is a remote access protocol type. As such, the type casting agent 145 type casts the connection protocol for the baremetal device and returns this connection information to the node manager 128. In one implementation, the connection information for the remote access protocol type includes a name of the protocol (e.g., iSCSI, NFS, etc.) to use to connect to the storage device 150. The baremetal container host 120 can then determine whether it has the capability to connect to the storage device 150 using the identified protocol and, if so, utilize the protocol to connect to the storage device 150.

In a further example, the type casting agent 145 may determine, based on the node information, that connection protocol for the hybrid-converged container host 130 is a local storage access protocol type. As such, the type casting agent 145 type casts the connection protocol for the hybrid-converged container host 130 and returns this connection information to the node manager 138. In one implementation, the connection information for the local storage access protocol type includes a location (e.g., host name or IP address) of the storage device 132. The hybrid-converged container host 130 can then utilize the location information to determine that the location information matches its own location information, and then use the device path in the connection information to connect to the storage device 132.

Once the connection information is received, the node manager 118, 128, 138 can then cause a connection to the storage device 150 to be initiated using the connection protocol that is based on the received connection information. Once the connection is established, the storage device 150 responds to the container host 110-130 and provides access to the PV 152.

In some implementations, the polymorphic connection type may be further extended and optimized to type cast additional types of connection protocols based on features beyond the environment of the container host 110-130. For example, the polymorphic connection types may further include secure connection protocols, such as encrypted iSCSI, that can be used when the type casting conditions indicate that the container host 110-130 is sensitive to data security issues (e.g., demilitarized zones (DMZ) or trusted network). In another example, the polymorphic connection types may include high-performance connection protocols, such as iSER, that can be used when the type casting conditions indicate that the container host 110-130 is performance sensitive. In the implementations using the extended polymorphic connection types, the container manager 140 may examine, in addition to the environment of the container host 1101-30, the particular type of compute job that is being requests (e.g., secure or high-performance). Additional extensions to the polymorphic connection types may be implemented beyond security and performance that recognize other factors that impact the container deployment system 100.

Figure 2:
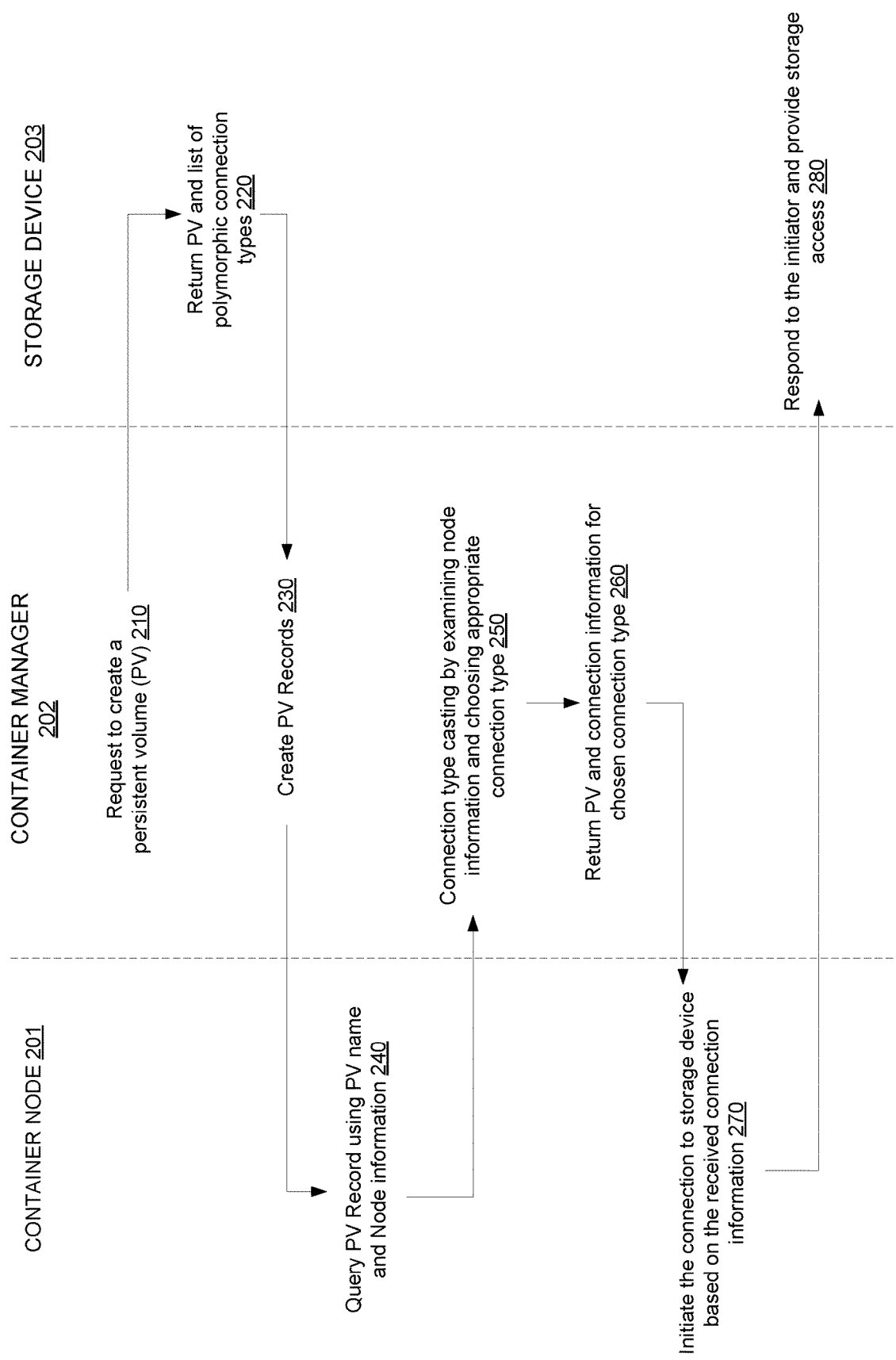
FIG. 2 illustrates a flow of operations for polymorphism and type casting for storage volume connections according to an implementation of the disclosure.

FIG. 2 illustrates a flow of operations 200, using an example Kubernetes environment, for polymorphism and type casting for storage volume connections according to an implementation of the disclosure. In some implementations, process 200 may be performed by a container host 201, a container manager 202, and a storage device 203. Container host may be any of VM container host 110, baremetal container host 120, or hybrid-converged container host 130, as described with respect to FIG. 1. Container manger 202 may be the same as container manager 140, as described with respect to FIG. 1. Storage device 203 may be the same as storage device 150 or local storage 132, as described with respect to FIG. 1.

As shown in FIG. 2, process 200 begins at 210 where the container manager 202 requests to create a PV and sends this request to the storage device 203. Then, at 220, the storage device returns a PV and a list of polymorphic connection types to the container manager 202. In one implementation, the polymorphic connection types may include, but are not limited to, hypervisor-initiated type, remote protocol access type, and local storage access type. In some implementations, the polymorphic connection types may be further extended to include secure and/or high-performance protocols as well.

At 230, the container manager 202 creates one or more PC records in response to receiving the PV and the list of polymorphic connection types. At 240, the compute node 201 queries the PV record of the container manager 202 using the PV name and node information of the container host 201. At 250, the container manager 202, in response to the query from the container host 201, performs connection type casting by examining the node information and choosing an appropriate connection type.

Subsequently, at 260, the container manager 202 returns the PV and the connection information for the chosen connection type to the container host 201. The, at 270, the container host 201 initiates the connection to the storage device 203 based on the received connection information. Lastly, at 280, the storage device 203 responds to the initiator (e.g., the container host 201) of the connection and provides storage access.

Figure 3:
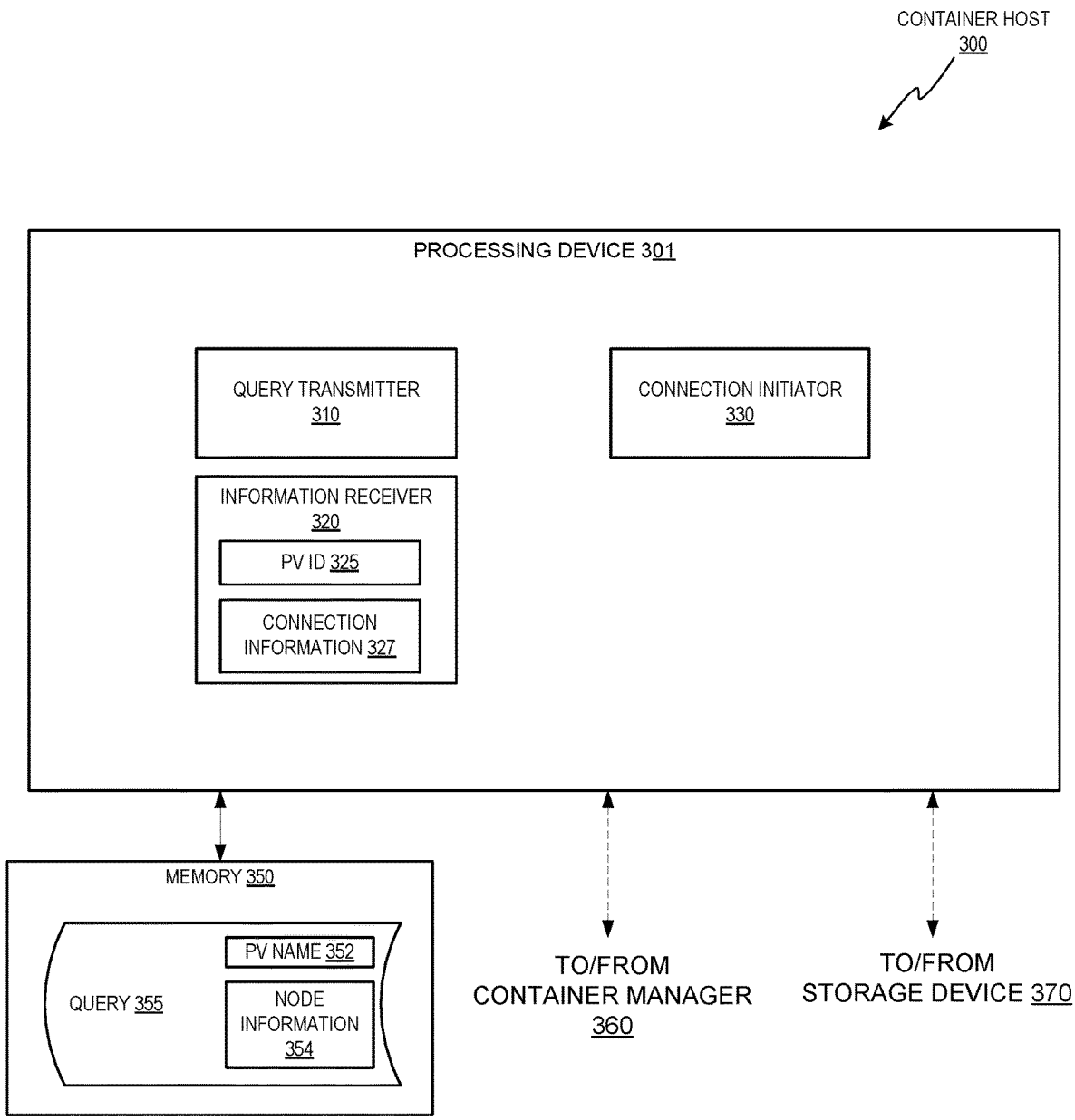
FIG. 3 depicts a block diagram of a computer system operating in accordance with one or more aspects of the disclosure.

FIG. 3 depicts a block diagram of a computer system that is a container host 300 operating in accordance with one or more aspects of the disclosure. Container host 300 may be the same or similar to container host 1110, 120, 130 of FIG. 1 and may include one or more processing devices 301 and one or more memory devices 350. In the example shown, container host 300 may include components and modules for polymorphism and type casting in storage volume connections.

The container host 300 may include a memory 350 that can store one or more a query 355. The memory 350 may be and/or include a volatile or non-volatile memory device, such as RAM (random-access memory), ROM (read-only memory), EEPROM (electrically erasable programmable read-only memory), or any other device capable of storing data.

The container host 300 may include a processing device 301 that implements polymorphism and type cast for storage volume connections according to implementations of the disclosure. The container host 300 may be communicably coupled to a container manager 360 and a storage device 370 via a network or other connection.

The processing device 301 may include a query transmitter 310, an information receiver 320, and a connection initiator 330. The query transmitter 310 may transmit, to a container manager 360, a query 355 for a PV record maintained by the container manager 360. The query 355 may include a name 352 of the PV and node information 354 of the container host 300.

The information receiver may receive, from the container manager 360, an identifier of the PV 325 and connection information 327. The connection information 327 is specific to a connection type, where the connection type is type casted by the container manager 360, using the node information 354, from a plurality of polymorphic connection types supported by the PV. The connection initiator 330 may establish, using the connection information 327, a connection to the storage device 370 via the connection type.

Figure 4:
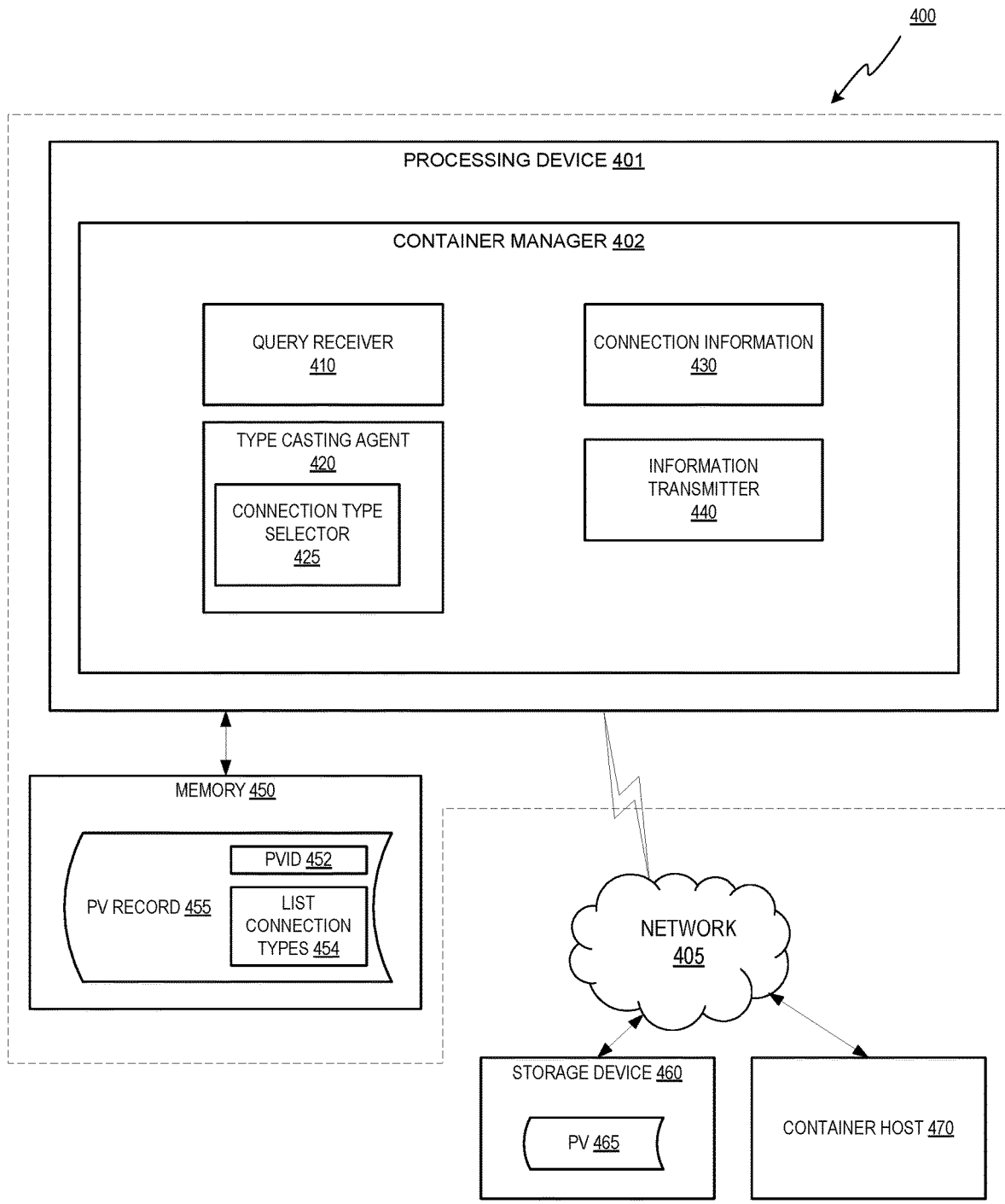
FIG. 4 a block diagram of a computer system operating in accordance with one or more aspects of the disclosure.

FIG. 4 depicts a block diagram of a computer system 400 operating in accordance with one or more aspects of the disclosure. Computer system 400 may be the same or similar to container manager 140 of FIG. 1 and may include one or more processing devices 401 and one or more memory devices 450. In the example shown, computer system 400 may include components and modules for polymorphism and type casting in storage volume connections.

The computer system 400 may include a memory 450 that can store one or more PV records 455. The PV record 455 may correspond to PVs 465 created on a storage device 460 communicably coupled to the computer system 400 via a network 405 or other connection. The PV record 455 includes a PV identifier 452 and a list of polymorphic connection types 454 supported by the PV 465 corresponding to the PV record 455. The memory 450 may be and/or include a volatile or non-volatile memory device, such as RAM (random-access memory), ROM (read-only memory), EEPROM (electrically erasable programmable read-only memory), or any other device capable of storing data.

The computer system 400 may include a processing device 401 that executes a container manager 402. Container manager 402 may be the same as container manager 140 describes with respect to FIG. 1. The container manager 402 may implement polymorphism and type casting in storage volume connections. The container manager 402 may include a query receiver 410, a type casting agent 420, connection information 430, and an information transmitter 440.

The query receiver 410 may receive a query for one of the PV records 455 from a container host 470 communicably coupled to the computer system 400 via a network 405 or other connection. The type casting agent 420 may perform type casting associated with a connection from the container host 470 to the storage device 460. Performing the type casting at the type casting agent 420 may include a connection type selector 425 of the type casting agent 420 selecting a connection type from the list of polymorphic connection types 454 in view of node information of the container host 475 comprised in the query.

The information transmitter 440 may transmit, to the container host 470 in response to the query, the identifier of the PV 452 and connection information 430 to cause the container host 470 to establish the connection to the storage device 460 via the selected connection type. The connection information 430 is different for each of the polymorphic connection types.

FIG. 5 is a flow diagram illustrating a method 500 for polymorphism and type casting in storage volume connections as applied by a container manager, according to an implementation of the disclosure. Method 500 can be performed by processing logic that may comprise hardware (e.g., circuitry, dedicated logic, programmable logic, microcode, etc.), software (such as instructions run on a processing device), firmware, or a combination thereof. In one implementation, method 500 is performed by a processing device (e.g. a processing device 1002 of FIG. 10) as described in connection with FIG. 1. In some implementations, method 500 can be performed by container manager 140 described with respect to FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media.

Referring to FIG. 5, method 500 begins at block 510 where the processing device performs one or more operations to receive an identifier of a PV created on a storage device and list of polymorphic connection types supported by the PV. At block 520, the processing device creates a PV record for the PV at the container manager. At block 530, the processing device performs, responsive to receiving a query of the PV record from a container host, type casting associated with a connection from the container host to the storage device. In one implementation, performing the type casting comprises selecting a connection type from the list of polymorphic connection types in view of node information of the container host comprised in the query.

Lastly, at block 540, the processing device returns, to the container host in response to the query, the identifier of the PV and connection information to cause the container host to establish the connection to the storage device via the selected connection type. In one implementation, the connection information is different for each of the polymorphic connection types.

Figure 6:
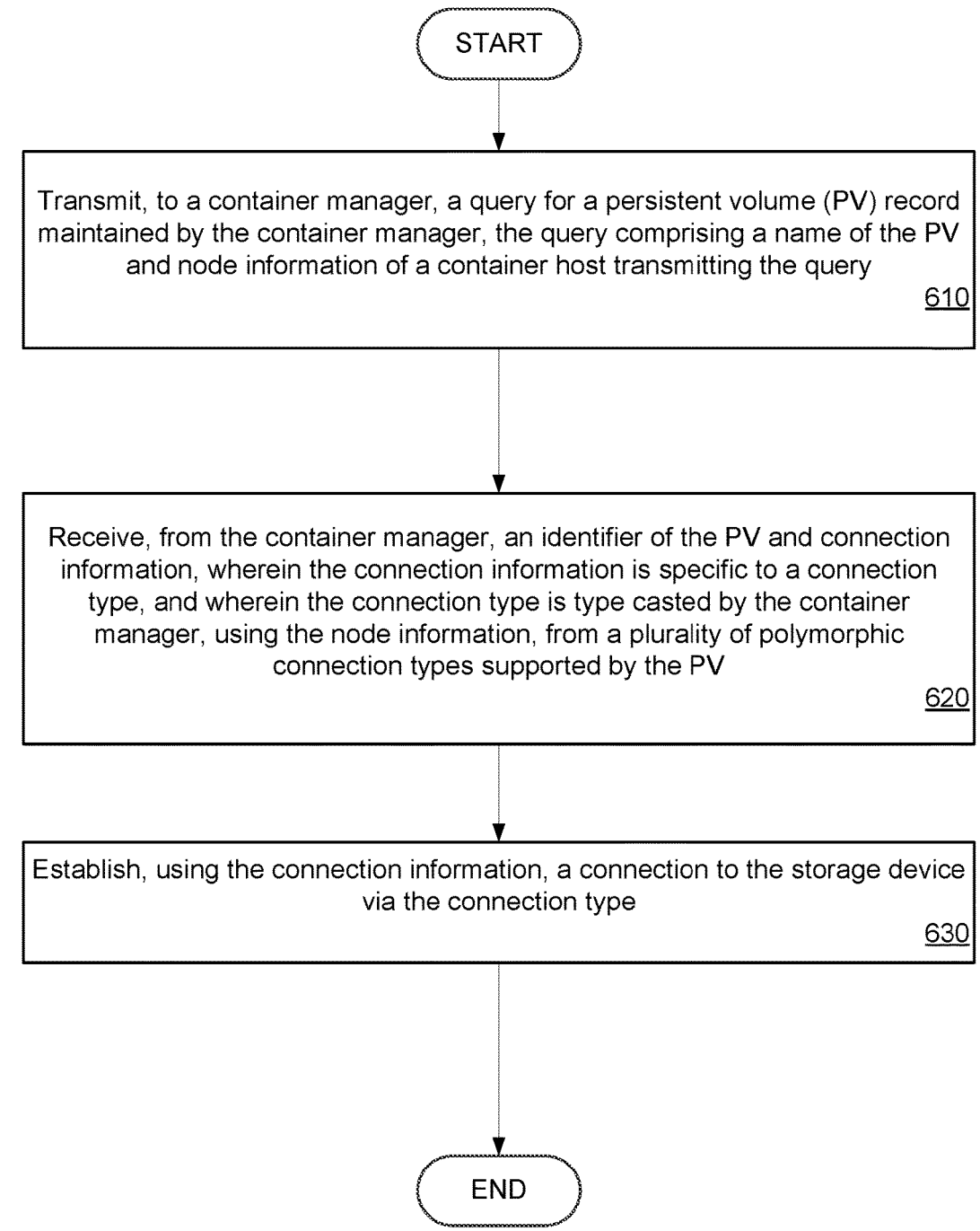
FIG. 6 is a flow diagram illustrating a method for polymorphism and type casting in storage volume connections as applied by a container host, according to an implementation of the disclosure.

FIG. 6 is a flow diagram illustrating a method 600 for polymorphism and type casting in storage volume connections as applied by a container host, according to an implementation of the disclosure. Method 600 can be performed by processing logic that may comprise hardware (e.g., circuitry, dedicated logic, programmable logic, microcode, etc.), software (such as instructions run on a processing device), firmware, or a combination thereof. In one implementation, method 600 is performed by a processing device (e.g. a processing device 1002 of FIG. 10) as described in connection with FIG. 1. In some implementations, method 600 can be performed by a source hypervisor running on the source computer system. In some implementations, method 600 can be performed by any of container hosts 1101-30 described with respect to FIG. 1.

Referring to FIG. 6, method 600 begins at block 610 where the processing device performs one or more operations to transmit, to a container manager, a query for a persistent volume (PV) record maintained by the container manager, the query comprising a name of the PV and node information of a container host including the processing device.

At block 620, the processing device receives, from the container manager, an identifier of the PV and connection information. In one implementation, the connection information is specific to a connection type. In addition, the connection type is type casted by the container manager, using the node information, from a plurality of polymorphic connection types supported by the PV. Lastly, at block 630, the processing device establishes, using the connection information, a connection to the storage device via the connection type.

FIG. 7 is a flow diagram illustrating another method 700 for polymorphism and type casting in storage volume connections as applied by a container manager, according to an implementation of the disclosure. Method 700 can be performed by processing logic that may comprise hardware (e.g., circuitry, dedicated logic, programmable logic, microcode, etc.), software (such as instructions run on a processing device), firmware, or a combination thereof. In one implementation, method 700 is performed by a processing device (e.g. a processing device 1002 of FIG. 10) as described in connection with FIG. 1. In some implementations, method 700 can be performed by container manager 140 described with respect to FIG. 1.

Method 700 can begin at block 710 where the processing device executes a container manager to manage one or more containers on one or more container hosts. At block 720, the processing device performs, responsive to receiving a query for a PV record from a container host, perform type casting associated with a connection from the container host to the storage device. In one implementation, performing the type casting includes selecting a connection type from the list of polymorphic connection types in view of node information of the container host comprised in the query. Furthermore, the PV record may correspond to a PV created on a storage device, wherein the PV record comprises a PV identifier and a list of polymorphic connection types supported by the PV corresponding to the PV record.

Lastly, at block 730, the processing device transmits, to the container host in response to the query, the identifier of the PV and connection information to cause the container host to establish the connection to the storage device via the selected connection type. In one implementation, the connection information is different for each of the polymorphic connection types.

Figure 8:
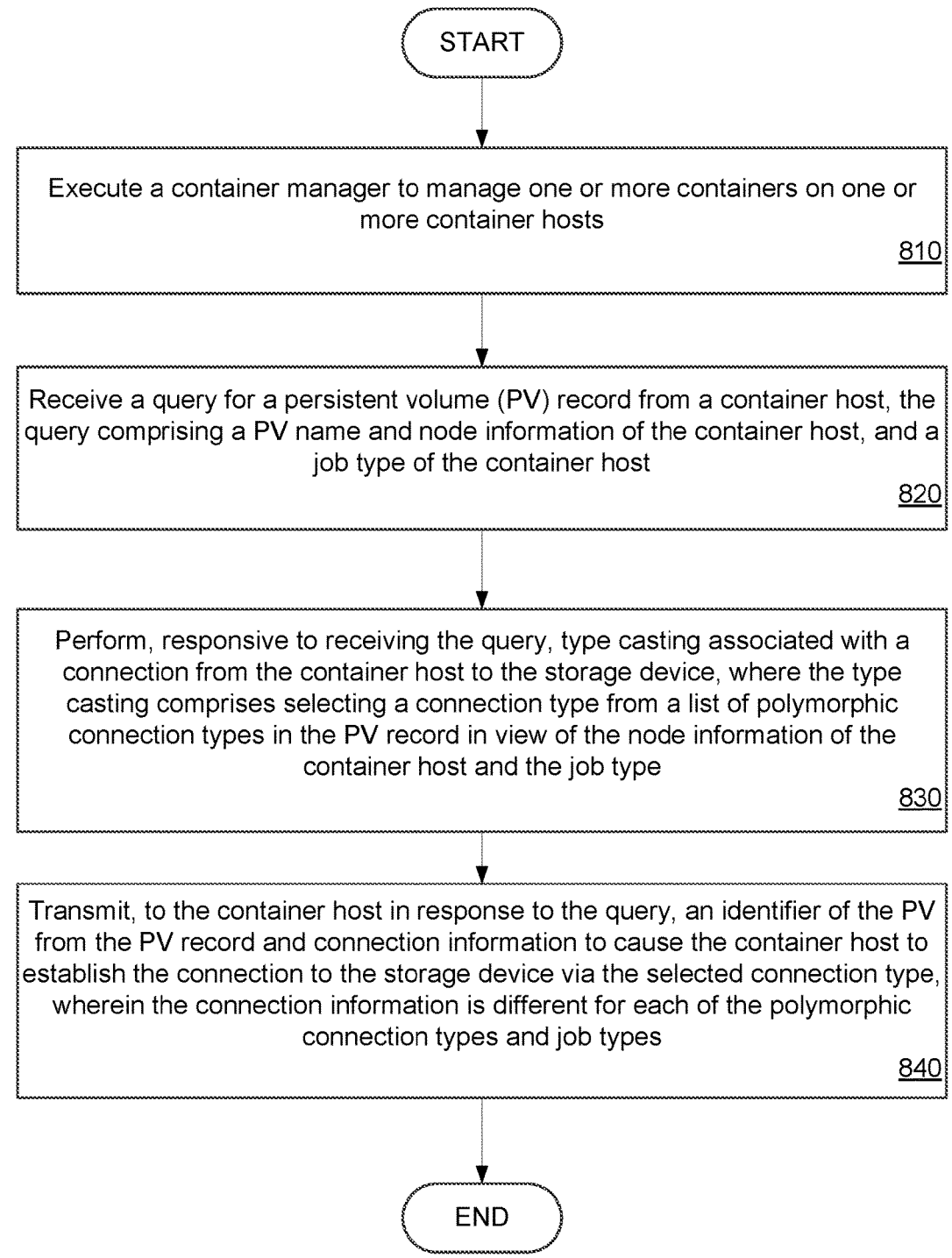
FIG. 8 is a flow diagram illustrating a method for polymorphism and type casting in storage volume connections with an optimization as applied by a container manager, according to an implementation of the disclosure.

FIG. 8 is a flow diagram illustrating a method 800 for polymorphism and type casting in storage volume connections with an optimization as applied by a container manager, according to an implementation of the disclosure. Method 800 can be performed by processing logic that may comprise hardware (e.g., circuitry, dedicated logic, programmable logic, microcode, etc.), software (such as instructions run on a processing device), firmware, or a combination thereof. In one implementation, method 800 is performed by a processing device (e.g. a processing device 1002 of FIG. 10) as described in connection with FIG. 1. In some implementations, method 800 can be performed by container manager 140 described with respect to FIG. 1.

Method 800 begins at block 810 where the processing device performs one or more operations to execute a container manager to manage one or more containers on one or more container hosts. Then, at block 820, the processing device receives a query for a PV record from a container host. In one implementation, the query includes a PV name and node information of the container host, and a job type of the container host.

Subsequently, at block 830, the processing device performs, responsive to receiving the query, type casting associated with a connection from the container host to the storage device. In one implementation, performing the type casting comprises selecting a connection type from a list of polymorphic connection types in the PV record in view of the node information of the container host and the job type.

Lastly, at block 840, the processing device transmits, to the container host in response to the query, an identifier of the PV from the PV record and connection information to cause the container host to establish the connection to the storage device via the selected connection type. In one implementation, the connection information is different for each of the polymorphic connection types and job types.

Figure 9:
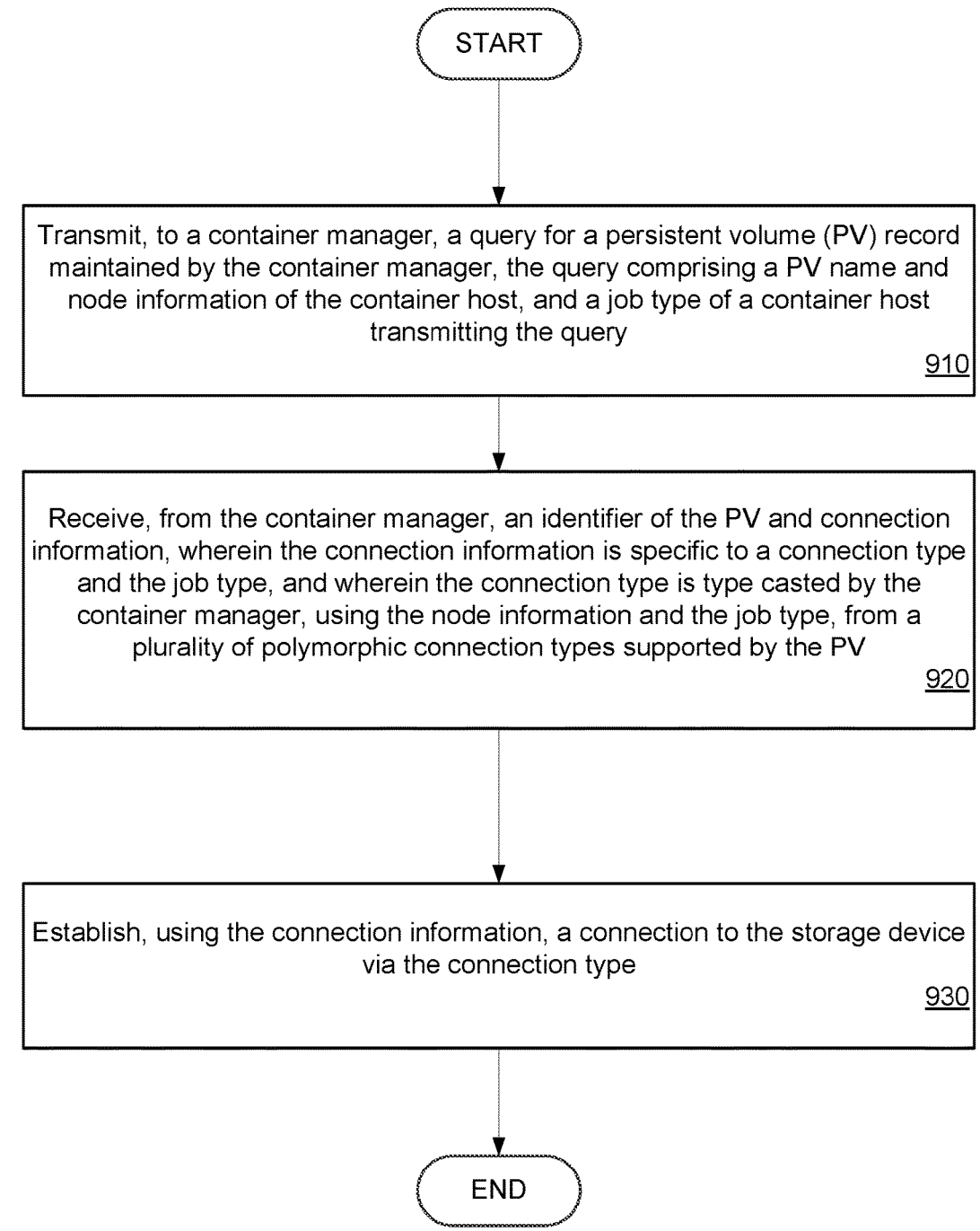
FIG. 9 is a flow diagram illustrating a method for polymorphism and type casting in storage volume connections with an optimization as applied by a container host, according to an implementation of the disclosure.

FIG. 9 is a flow diagram illustrating a method 900 for polymorphism and type casting in storage volume connections with an optimization as applied by a container host, according to an implementation of the disclosure. Method 900 can be performed by processing logic that may comprise hardware (e.g., circuitry, dedicated logic, programmable logic, microcode, etc.), software (such as instructions run on a processing device), firmware, or a combination thereof. In one implementation, method 900 is performed by a processing device (e.g. a processing device 1002 of FIG. 10) as described in connection with FIG. 1. In some implementations, method 900 can be performed by any of container hosts 110-130 described with respect to FIG. 1.

Method 900 begins at block 910 where the processing device transmits, to a container manager, a query for a PV record maintained by the container manager. In one implementation, the query comprising a PV name and node information of the container host, and a job type of the container host.

At block 920, the processing device receives, from the container manager, an identifier of the PV and connection information. In one implementation, the connection information is specific to a connection type and the job type. The connection type may be type casted by the container manager, using the node information and the job type, from a plurality of polymorphic connection types supported by the PV. Lastly, at block 930, the processing device establishes, using the connection information, a connection to the storage device via the connection type.

Figure 10:
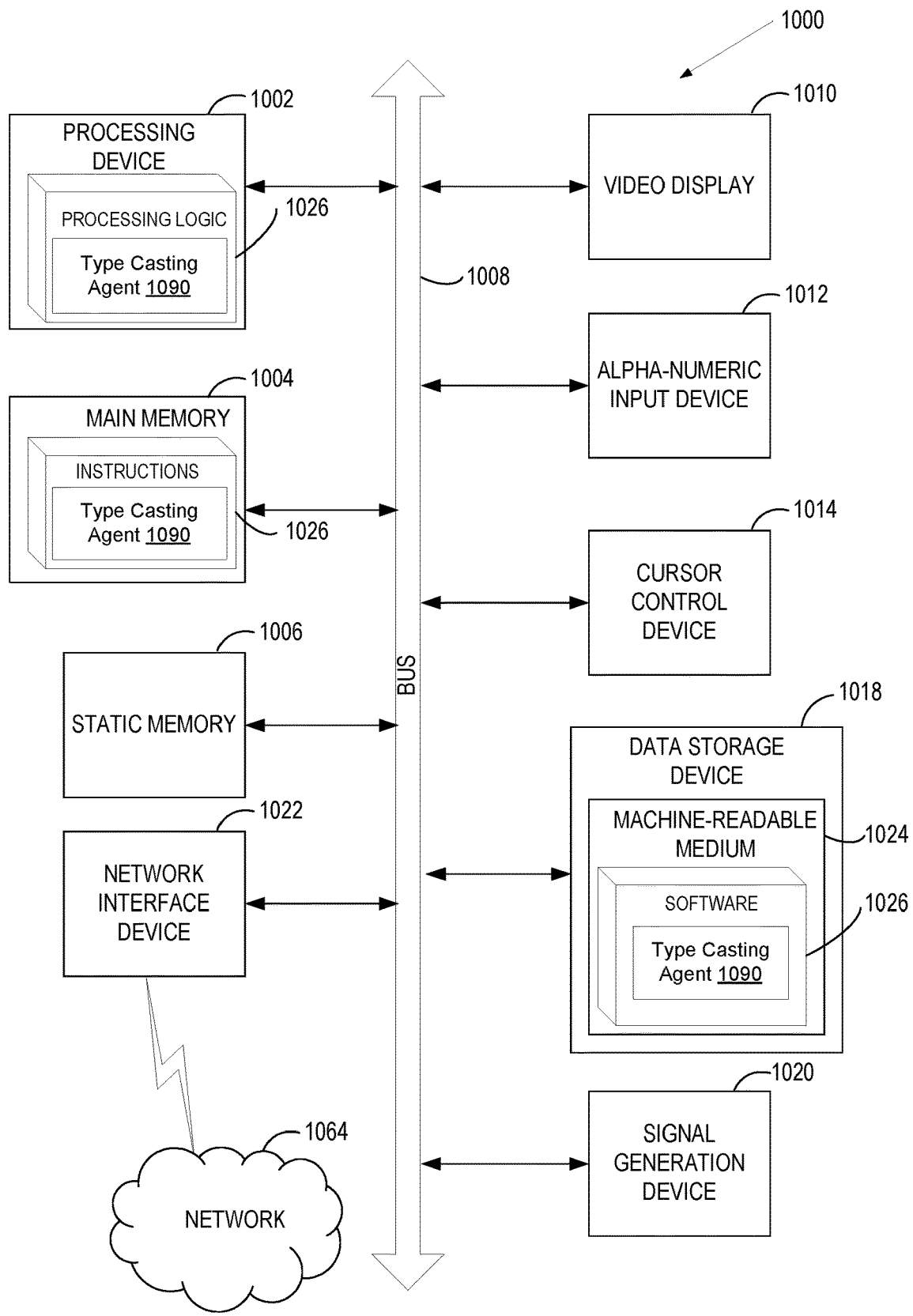
FIG. 10 illustrates a block diagram of one implementation of a computer system.

FIG. 10 illustrates a diagrammatic representation of a machine in the example form of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002 (e.g., processor, CPU, etc.), a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1008.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 426 for performing the operations and steps discussed herein.

The computer system 1000 may further include a network interface device 1022 communicably coupled to a network 1064. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a machine-accessible storage medium 1024 on which is stored software 1026 embodying any one or more of the methodologies or functions described herein. The software 1026 may also reside, completely or at least partially, within the main memory 1004 as instructions 1026 and/or within the processing device 1002 as processing logic 1026 during execution thereof by the computer system 1000; the main memory 1004 and the processing device 1002 also constituting machine-accessible storage media.

The machine-readable storage medium 1024 may also be used to store instructions 1026 to implement a type casting agent 1090 and/or a software library containing methods that call the above applications. Type casting agent 1090 can implement polymorphism and type casting in storage volume connections by performing one or more operations described in connection with FIGS. 1-9 above. While the machine-accessible storage medium 1024 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Other computer system designs and configurations may also be suitable to implement the system and methods described herein. The following examples illustrate various implementations in accordance with one or more aspects of the disclosure.

The following examples pertain to further embodiments. Example 1 is a method for polymorphism and type casting in storage volume connections comprising receiving, by a processing device executing a container manager, an identifier of a persistent volume (PV) created on a storage device and list of polymorphic connection types supported by the PV, creating a PV record for the PV at the container manager, and responsive to receiving a query of the PV record from a container host, performing type casting associated with a connection from the container host to the storage device, wherein performing the type casting comprises selecting a connection type from the list of polymorphic connection types in view of node information of the container host comprised in the query. Further to Example 1, the method additionally comprises returning, to the container host in response to the query, the identifier of the PV and connection information to cause the container host to establish the connection to the storage device via the selected connection type, wherein the connection information is different for each of the polymorphic connection types.

In Example 2, the subject matter of Example 1 can optionally include wherein the PV record comprises at least one of the identifier of the PV, a storage capacity of the PV, the polymorphic connection types supported by the PV, or access mode of the PV. In Example 3, the subject matter of any one of Examples 1-2 can optionally include wherein the node information comprises at least one of a node identifier, cloud configuration information, and machine configuration information. In Example 4, the subject matter of any one of Examples 1-3 can optionally include wherein the connection types comprise at least one of a hypervisor type, a remote access protocol type, or a local volume type.

In Example 5, the subject matter of any one of Examples 1-4 can optionally include wherein the hypervisor type indicates a container of the container host is implemented on a virtual machine managed by a hypervisor of the container host. In Example 6, the subject matter of any one of Examples 1-5 can optionally include wherein the connection information comprises a device identifier (ID) of the storage device, the device ID used by the hypervisor to establish the connection to the storage device.

In Example 7, the subject matter of any one of Examples 1-6 can optionally include wherein the remote access protocol type indicates a container of the container host is implemented on baremetal components of the container host. In Example 8, the subject matter of any one of Examples 1-7 can optionally include wherein the connection information comprises an identification of a connection protocol for the container host to use to establish the connection to the storage device. In Example 9, the subject matter of any one of Examples 1-8 can optionally include wherein the local volume type indicates a container of the container host is co-located with the storage device on the container host.

In Example 10, the subject matter of any one of Examples 1-9 can optionally include wherein the connection information comprises a location of the storage device, the location used to identify a device path used by the compute to establish the connection to the storage device, wherein the location comprises at least one of a host name or an Internet Protocol (IP) address of the storage device.

Example 11 is a non-transitory computer-readable medium for implementing polymorphism and type casting in storage volume connections. In Example 11, the non-transitory machine-readable medium includes instructions that, when executed by a processing device, cause the processing device to transmit, by the processing device to a container manager, a query for a persistent volume (PV) record maintained by the container manager, the query comprising a name of the PV and node information of a container host comprising the processing device. In Example 11, the processing device is further to receive, by the processing device from the container manager, an identifier of the PV and connection information, wherein the connection information is specific to a connection type, and wherein the connection type is type casted by the container manager, using the node information, from a plurality of polymorphic connection types supported by the PV, and establish, by the processing device using the connection information, a connection to the storage device via the connection type.

In Example 12, the subject matter of Example 11 can optionally include wherein the PV record comprises at least one of the identifier of the PV, a storage capacity of the PV, the polymorphic connection types supported by the PV, or access mode of the PV. In Example 13, the subject matter of Examples 11-12 can optionally include wherein the node information comprises at least one of a node identifier, cloud configuration information, and machine configuration information.

In Example 14, the subject matter of Examples 11-13 can optionally include wherein the connection types comprise at least one of a hypervisor type, a remote access protocol type, or a local volume type. In Example 15, the subject matter of Examples 11-14 can optionally include wherein the hypervisor type indicates a container of the container host is implemented on a virtual machine managed by a hypervisor of the container host, and wherein the connection information comprises a device identifier (ID) of the storage device, the device ID used by the hypervisor to establish the connection to the storage device.

In Example 16, the subject matter of Examples 11-15 can optionally include wherein the remote access protocol type indicates a container of the container host is implemented on baremetal components of the container host, and wherein the connection information comprises an identification of a connection protocol for the container host to use to establish the connection to the storage device. In Example 17, the subject matter of Examples 11-16 can optionally include wherein the local volume type indicates a container of the container host is co-located with the storage device on the container host, and wherein the connection information comprises a location of the storage device, the location used to identify a device path used by the compute to establish the connection to the storage device, wherein the location comprises at least one of a host name or an Internet Protocol (IP) address of the storage device.

Example 18 is an apparatus for implementing polymorphism and type casting in storage volume connections. In Example 18, the apparatus includes a memory to store persistent volume (PV) records corresponding to PVs created on a storage device, wherein each PV record comprises a PV identifier and a list of polymorphic connection types supported by the PV corresponding to the PV record. In Example 18, the apparatus further includes a processing device communicably coupled to the memory. Further to Example 18, the processing device can execute a container manager to manage one or more containers on one or more container hosts and responsive to receiving a query for one of the PV records from a container host, perform type casting associated with a connection from the container host to the storage device, wherein performing the type casting comprises selecting a connection type from the list of polymorphic connection types in view of node information of the container host comprised in the query. In Example 18, the processing device can further transmit, to the container host in response to the query, the identifier of the PV and connection information to cause the container host to establish the connection to the storage device via the selected connection type, wherein the connection information is different for each of the polymorphic connection types.

In Example 19, the subject matter of Example 18 can optionally include wherein the PV record comprises at least one of the identifier of the PV, a storage capacity of the PV, the polymorphic connection types supported by the PV, or access mode of the PV. In Example 20, the subject matter of Examples 18-19 can optionally include wherein the node information comprises at least one of a node identifier, cloud configuration information, and machine configuration information. In Example 21, the subject matter of Examples 18-20 can optionally include wherein the connection types comprise at least one of a hypervisor type, a remote access protocol type, or a local volume type.

In Example 22, the subject matter of Examples 18-21 can optionally include wherein the hypervisor type indicates a container of the container host is implemented on a virtual machine managed by a hypervisor of the container host, and wherein the connection information comprises a device identifier (ID) of the storage device, the device ID used by the hypervisor to establish the connection to the storage device.

In Example 23, the subject matter of Examples 18-22 can optionally include wherein the remote access protocol type indicates a container of the container host is implemented on baremetal components of the container host, and wherein the connection information comprises an identification of a connection protocol for the container host to use to establish the connection to the storage device. In Example 24, the subject matter of Examples 18-23 can optionally include wherein the local volume type indicates a container of the container host is co-located with the storage device on the container host, and wherein the connection information comprises a location of the storage device, the location used to identify a device path used by the compute to establish the connection to the storage device, wherein the location comprises at least one of a host name or an Internet Protocol (IP) address of the storage device.

Example 25 is a system for implementing polymorphism and type casting in storage volume connections. In Example 20, the system includes a memory and a processing device coupled to the memory. Further to Example 20, the processing device can execute a container manager to manage one or more containers on one or more container hosts and receive a query for a persistent volume (PV) record from a container host, the query comprising a PV name and node information of the container host, and a job type of the container host. Further to Example 25, the processing device can responsive to receiving the query, perform type casting associated with a connection from the container host to the storage device, wherein performing the type casting comprises selecting a connection type from a list of polymorphic connection types in the PV record in view of the node information of the container host and the job type, and transmit, to the container host in response to the query, an identifier of the PV from the PV record and connection information to cause the container host to establish the connection to the storage device via the selected connection type, wherein the connection information is different for each of the polymorphic connection types and job types.

In Example 26, the subject matter of Example 25 can optionally include wherein the PV record comprises at least one of the identifier of the PV, a storage capacity of the PV, the polymorphic connection types supported by the PV, or access mode of the PV. In Example 27, the subject matter of any one of Examples 25-26 can optionally include wherein the node information comprises at least one of a node identifier, cloud configuration information, and machine configuration information.

In Example 28, the subject matter of any one of Examples 25-27 can optionally include wherein the connection types comprise at least one of a hypervisor type, a remote access protocol type, or a local volume type, and wherein the job types comprise at least one of security sensitive or performance sensitive. In Example 29, the subject matter of any one of Examples 25-28 can optionally include wherein the hypervisor type indicates a container of the container host is implemented on a virtual machine managed by a hypervisor of the container host, and wherein the connection information comprises a device identifier (ID) of the storage device, the device ID used by the hypervisor to establish the connection to the storage device.

In Example 30, the subject matter of any one of Examples 25-29 can optionally include wherein the remote access protocol type indicates a container of the container host is implemented on baremetal components of the container host, and wherein the connection information comprises an identification of a connection protocol for the container host to use to establish the connection to the storage device. In Example 31, the subject matter of any one of Examples 25-30 can optionally include wherein the local volume type indicates a container of the container host is co-located with the storage device on the container host, and wherein the connection information comprises a location of the storage device, the location used to identify a device path used by the compute to establish the connection to the storage device, wherein the location comprises at least one of a host name or an Internet Protocol (IP) address of the storage device.

Example 31 is another method for polymorphism and type casting in storage volume connections comprising transmitting, by a processing device executing a container host to a container manager, a query for a persistent volume (PV) record maintained by the container manager, the query comprising a PV name and node information of the container host, and a job type of the container host. Further to Example 1, the method additionally comprises receiving, by the processing device from the container manager, an identifier of the PV and connection information, wherein the connection information is specific to a connection type and the job type, and wherein the connection type is type casted by the container manager, using the node information and the job type, from a plurality of polymorphic connection types supported by the PV, and establishing, by the processing device using the connection information, a connection to the storage device via the connection type.

In Example 32, the subject matter of Example 31 can optionally include wherein the PV record comprises at least one of the identifier of the PV, a storage capacity of the PV, the polymorphic connection types supported by the PV, or access mode of the PV. In Example 33, the subject matter of any one of Examples 31-32 can optionally include wherein the node information comprises at least one of a node identifier, cloud configuration information, and machine configuration information.

In Example 34, the subject matter of any one of Examples 31-33 can optionally include wherein the connection types comprise at least one of a hypervisor type, a remote access protocol type, or a local volume type, and wherein the job type comprises at least one of security sensitive or performance sensitive. In Example 35, the subject matter of any one of Examples 31-34 can optionally include wherein the hypervisor type indicates a container of the container host is implemented on a virtual machine managed by a hypervisor of the container host, and wherein the connection information comprises a device identifier (ID) of the storage device, the device ID used by the hypervisor to establish the connection to the storage device.

In Example 36, the subject matter of any one of Examples 31-35 can optionally include wherein the remote access protocol type indicates a container of the container host is implemented on baremetal components of the container host, and wherein the connection information comprises an identification of a connection protocol for the container host to use to establish the connection to the storage device. In Example 37, the subject matter of any one of Examples 31-36 can optionally include wherein the local volume type indicates a container of the container host is co-located with the storage device on the container host, and wherein the connection information comprises a location of the storage device, the location used to identify a device path used by the compute to establish the connection to the storage device, wherein the location comprises at least one of a host name or an Internet Protocol (IP) address of the storage device.

Example 38 is an apparatus for implementing polymorphism and type casting in storage volume connections comprising means for receiving an identifier of a persistent volume (PV) created on a storage device and list of polymorphic connection types supported by the PV, means for creating a PV record for the PV at the container manager, means for performing, responsive to receiving a query of the PV record from a container host, type casting associated with a connection from the container host to the storage device, wherein performing the type casting comprises selecting a connection type from the list of polymorphic connection types in view of node information of the container host comprised in the query, and means for returning, to the container host in response to the query, the identifier of the PV and connection information to cause the container host to establish the connection to the storage device via the selected connection type, wherein the connection information is different for each of the polymorphic connection types. In Example 39, the subject matter of Example 38 can optionally include the apparatus further configured to perform the method of any one of the Examples 1 to 37.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "removing," "copying," "storing," "broadcasting," "reassigning," "storing," "allocating," "determining," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
    receiving, by a processing device executing a container manager, a query comprising a persistent volume (PV) identifier of a PV created on a storage device, a PV name of a container host, node information of the container host, and a job type of the container host, wherein the node information comprises at least one of a node identifier, cloud configuration information, or machine configuration information, wherein the PV identifier and a list of polymorphic connection types supported by the PV are stored in a memory associated with the processing device, and wherein first connection information associated with a first polymorphic connection type of the list is different from second connection information associated with a second polymorphic connection type of the list; and
    responsive to receiving the query, performing, by the processing device for a connection from the container host to the storage device, type casting to identify a connection type from the list of polymorphic connection types and connection information for the connection type to enable establishment of the connection between the container host and the storage device.

2. The method of claim 1, wherein the connection type is selected from the list of polymorphic connection types in view of the node information of the container host comprised in the query.

3. The method of claim 1, wherein a PV record stored in the memory comprises at least one of the PV identifier of the PV, a storage capacity of the PV, the polymorphic connection types supported by the PV, or access mode of the PV.

4. The method of claim 1, wherein the polymorphic connection types comprise at least one of a hypervisor type, a remote access protocol type, or a local volume type, and wherein a protocol utilized to establish a communication connection between the container host and the storage device in order for a container of the container host to consume the PV is identified in view of a type of environment of the container host.

5. The method of claim 4, wherein the hypervisor type indicates a container of the container host is implemented on a virtual machine managed by a hypervisor of the container host, and wherein the connection information comprises a device identifier (ID) of the storage device, the device ID used by the hypervisor to establish the connection to the storage device.

6. The method of claim 4, wherein the remote access protocol type indicates a container of the container host is implemented on baremetal components of the container host, and wherein the connection information comprises an identification of a connection protocol for the container host to use to establish the connection to the storage device.

7. The method of claim 4, wherein the local volume type indicates a container of the container host is co-located with the storage device on the container host, and wherein the connection information comprises a location of the storage device, the location used to identify a device path used by the compute to establish the connection to the storage device, wherein the location comprises at least one of a host name or an Internet Protocol (IP) address of the storage device.

8. The method of claim 1, further comprising binding, by the processing device, created PVs to requests for storage generated by node manager for containers, wherein a claim comprises a request for a specific size and access mode of storage, and wherein a storage manager to match a node manager's claim to provisioned PVs and bind the PV and claim together.

9. The method of claim 1, wherein the polymorphic connection types further comprise at least one of a secure connection protocol or a high-performance connection protocol, and wherein the container manager further examines a particular type of compute job requested.

10. A non-transitory machine-readable storage medium including instructions that, when executed by a processing device, cause the processing device to:
receive a query comprising a persistent volume (PV) identifier of a PV created on a storage device, a PV name of a container host, node information of the container host, and a job type of the container host, wherein the node information comprises at least one of a node identifier, cloud configuration information, or machine configuration information, wherein the PV identifier and a list of polymorphic connection types supported by the PV are stored in a memory associated with the processing device, and wherein first connection information associated with a first polymorphic connection type of the list is different from second connection information associated with a second polymorphic connection type of the list; and
responsive to receiving the query, perform, for a connection from the container host to the storage device, type casting to identify a connection type from the list of polymorphic connection types and connection information for the connection type to enable establishment of the connection between the container host and the storage device.

11. The non-transitory machine-readable storage medium of claim 10, wherein a PV record stored in the memory comprises at least one of the PV identifier of the PV, a storage capacity of the PV, the polymorphic connection types supported by the PV, or access mode of the PV.

12. The non-transitory machine-readable storage medium of claim 10, wherein the polymorphic connection types comprise at least one of a hypervisor type, a remote access protocol type, or a local volume type.

13. The non-transitory machine-readable storage medium of claim 12, wherein the hypervisor type indicates a container of the container host is implemented on a virtual machine managed by a hypervisor of the container host, and wherein the connection information comprises a device identifier (ID) of the storage device, the device ID used by the hypervisor to establish the connection to the storage device.

14. The non-transitory machine-readable storage medium of claim 12, wherein the remote access protocol type indicates a container of the container host is implemented on baremetal components of the container host, and wherein the connection information comprises an identification of a connection protocol for the container host to use to establish the connection to the storage device.

15. The non-transitory machine-readable storage medium of claim 12, wherein the local volume type indicates a container of the container host is co-located with the storage device on the container host, and wherein the connection information comprises a location of the storage device, the location used to identify a device path used by the compute to establish the connection to the storage device, wherein the location comprises at least one of a host name or an Internet Protocol (IP) address of the storage device.

16. An apparatus comprising:
a memory to store a persistent volume (PV) record corresponding to a PV created on a storage device, wherein the PV record comprises a PV identifier and a list of polymorphic connection types supported by the PV corresponding to the PV record, and wherein first connection information associated with a first polymorphic connection type of the list is different from second connection information associated with a second polymorphic connection type of the list; and
a processing device communicably coupled to the memory, to, responsive to receiving a query comprising the PV identifier, a PV name of a container host, node information of the container host, and a job type of the container host, perform, for a connection from a container host to the storage device, type casting to identify a connection type from the list of polymorphic connection types and connection information for the connection type to enable establishment of the connection between the container host and the storage device wherein the node information comprises at least one of a node identifier, cloud configuration information, or machine configuration information.

17. The apparatus of claim 16, further comprising binding created PVs to requests for storage generated by node manager for containers, wherein a claim comprises a request for a specific size and access mode of storage, and wherein a storage manager to match a node manager's claim to provisioned PVs and bind the PV and claim together.

\* \* \* \* \*